United States Patent [19]
Stanley

[11] 4,298,142
[45] Nov. 3, 1981

[54] ARTICLE HOLDER AND DISPENSER INCLUDING ADJUSTABLE DISPENSING MEANS AND ONE-WAY DISCHARGE OPENING

[75] Inventor: Lorne R. Stanley, Hillsborough, Calif.

[73] Assignee: Safe-T Pacific Company, Redwood City, Calif.

[21] Appl. No.: 79,705

[22] Filed: Sep. 28, 1979

[51] Int. Cl.[3] .......................... A47F 1/08; B65G 59/10
[52] U.S. Cl. ...................................... 221/304; 221/310
[58] Field of Search .......................... 221/304, 307–310

[56] References Cited

U.S. PATENT DOCUMENTS 3,435,987 4/1969 Saunders et al. .................. 221/307
3,790,023 2/1974 Filipowicz .......................... 221/304

FOREIGN PATENT DOCUMENTS 714125 8/1954 United Kingdom ................ 221/307

*Primary Examiner*—F. J. Bartuska
*Attorney, Agent, or Firm*—Flehr, Hohbach, Test, Albritton & Herbert

[57] ABSTRACT

An article holder and dispenser assembly including an elongate hollow container especially suitable for storing and dispensing nested articles such as ice cream cones, cups and the like is disclosed herein along with a particular arrangement including article retaining members for releasably retaining articles of different sizes at the discharge end of the container. The overall assembly, as disclosed, also includes a retainer locking ring removably positioned within the hollow container and cooperating with the article retaining members for preventing the latter from allowing the articles, once dispensed, from being reinserted back into the container through the discharge end.

10 Claims, 10 Drawing Figures

ARTICLE HOLDER AND DISPENSER INCLUDING ADJUSTABLE DISPENSING MEANS AND ONE-WAY DISCHARGE OPENING

BACKGROUND OF THE INVENTION

The present invention relates generally to article holding and dispensing apparatus including an arrangement for releasably retaining articles such as ice cream cones, cups and the like at its discharge end and more particularly to an uncomplicated and economical technique for preventing the articles, once dispensed, from being reinserted back into the apparatus at its discharge end. A specific article holding and dispensing apparatus for which the present invention is especially suitable is disclosed in co-pending U.S. Patent application Ser. No. 079,708 filed Sept. 28, 1979 entitled ARTICLE HOLDER AND DISPENSER INCLUDING ADJUSTABLE DISPENSING MEANS AND METHOD in the name of GUNTHER FUSS and assigned to the Assignee of the present invention.

While the article storing and dispensing apparatus (including its various modifications) disclosed in the FUSS Application just cited is generally satisfactory for its intended purpose, it does not prevent articles, once dispensed through its discharge opening, from being reinserted back into the apparatus through the same opening. As will be seen hereinafter, the present invention provides such a feature, that is, a one-way discharge opening. As will also be seen, this is accomplished in an uncomplicated and economical way.

OBJECTS AND SUMMARY OF THE INVENTION

In view of the foregoing, one object of the present invention is to provide an article storing and dispensing assembly which utilizes retainer elements for releasably retaining nested articles such as ice cream cones, cups and the like located within an elongate hollow container having a one-way discharge opening such that an article, once dispensed through the opening cannot be reinserted through the opening and back into the container.

Another object of the present invention is to provide an uncomplicated and economical way of providing the last-mentioned one-way opening in the container.

A more particular object of the present invention is a one-way discharge opening in an article storing and dispensing assembly including article retaining elements of the type disclosed in the above-recited FUSS patent application.

As will be seen hereinafter, the article storing and dispensing assembly disclosed herein is one which is especially suitable for nested articles such as ice cream cones, cups and the like, as stated previously. This assembly includes an elongate hollow container, preferably an annular one, which is provided for storing the nested articles and which defines a discharge opening at one end thereof for dispensing the articles therethrough. The assembly also includes a plurality of circumferentially spaced article retaining elements located within the container adjacent its interior surface and also adjacent the periphery of its discharge opening. These retaining elements serve to protrude into the discharge opening for establishing the effective size of the latter and also for releasably retaining the articles to be dispensed.

In accordance with the present invention, the container just mentioned includes means cooperating with the retaining elements for preventing the latter from allowing the articles, once dispensed, from being reinserted back into the container through its discharge opening. In a preferred embodiment, a locking ring removably positioned within the container is utilized to accomplish this.

DETAILED DESCRIPTION

Figure 1:
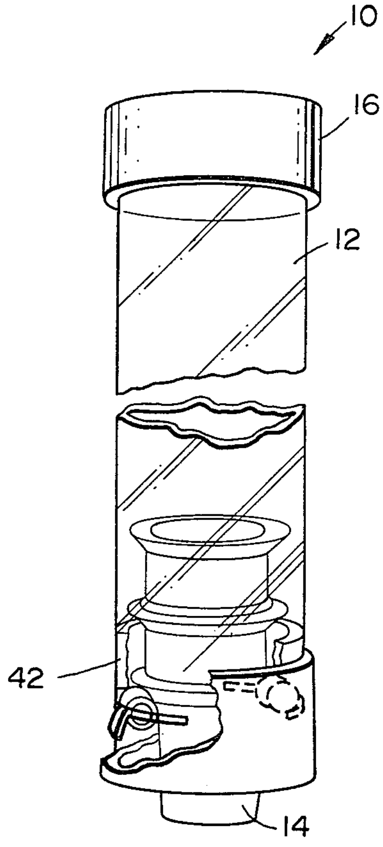
FIG. 1 is a partially broken away perspective view of an article holding and dispensing apparatus designed in accordance with the present invention.

Turning to the drawings, wherein like components are designated by like reference numerals throughout the various figures, an article holding and dispensing assembly designed in accordance with the present invention is illustrated in FIGS. 1 to 4 and generally designated by the reference numeral 10. As seen best in FIGS. 1 and 2, this assembly includes an elongate hollow cylindrical tube or container 12 for storing therein nested articles such as fragile baked ice cream cones or cups, fragile drinking cups such as foam insulated cups or the like. In the embodiment illustrated, a stack of ice cream cones 14 are maintained within the container and will be referred to throughout the following discussion. However, it is to be understood that the present invention is not limited to these particular articles.

Figure 3:
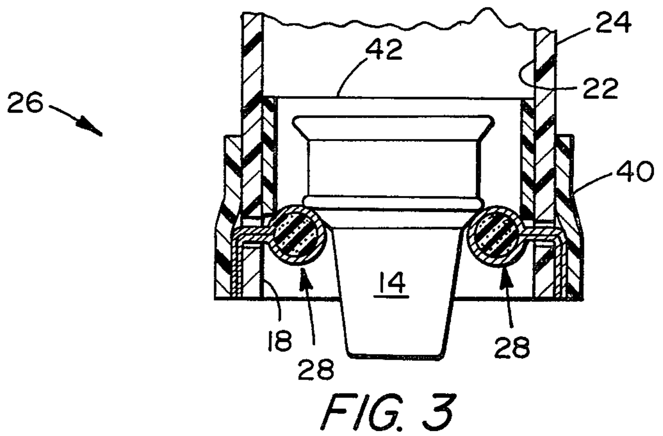
FIG. 3 is a vertical sectional view of the bottom end of the assembly of FIG. 1, specifically showing how an ice cream cone is retained therein.

In a preferred embodiment, container 12 is formed of a plastic material which may or may not be transparent and which, as shown, carries a top closure or cap 16 at its top end for preventing entry of foreign objects or contamination. As best seen in FIG. 3, its bottom end is opened so as to provide a discharge opening generally indicated at 18 for passage of ice cream cones 14. While not shown, suitable means such as supporting rings may be provided for supporting the entire assembly in a fixed, vertically extending position such as the one shown in FIG. 1. In a preferred embodiment, four containers are supported on and around a single support stand.

For reasons to be discussed hereinafter, container 12 includes a pair of elongated circumferentially extending slots 20 spaced from one another around its periphery slightly above and equal distances from open end 18. In the embodiment shown, these slots which extend entirely through container 12 from its interior surface 22 to its exterior surface 24 (see FIG. 3) are equal lengths circumferentially and are spaced diametrically opposite one another.

Referring specifically to FIG. 3, assembly 10 is shown including an arrangement 26 for releasably retaining cones 14 at the discharge end 18 of container 12 while, at the same time, establishing an effective size for the discharge opening. As will be seen hereinafter, this arrangement uses article retaining elements 28 which are supported for movement in a circumferential manner as described in detail in the above-recited FUSS application for adjusting the effective size of discharge opening 18.

Figure 2:
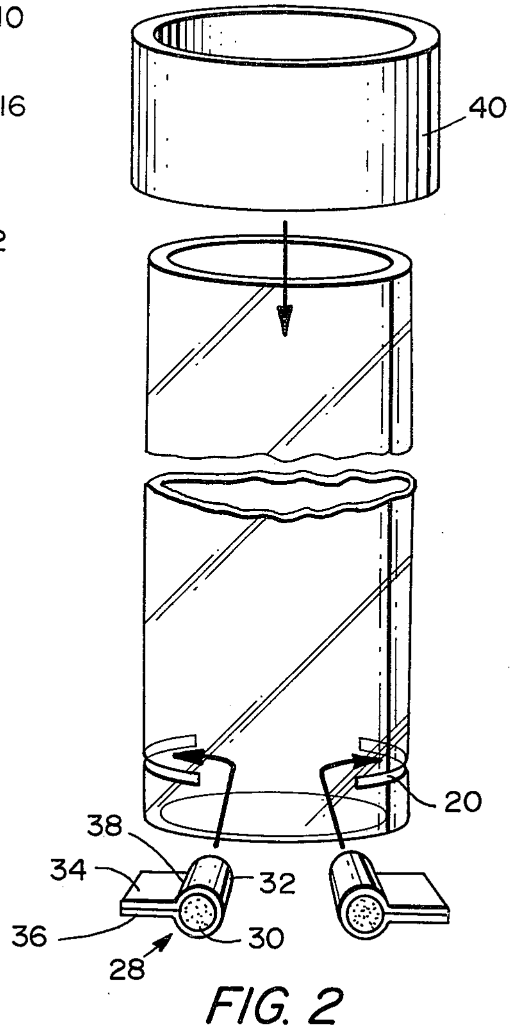
FIG. 2 is an enlarged exploded perspective view of the assembly illustrated in FIG. 1.

There are two articles retaining elements 28 comprising part of arrangement 26 as best shown in FIGS. 2 and 3, one for each circumferential slot 20. Each article retaining element includes a cylindrical core 30 constructed of relatively resilient material, specifically foam rubber in a preferred embodiment, which serves to minimize damage to the cones as the latter pass between the retaining elements during dispensing of the cones and which to a limited degree accommodates for size variations in the articles being releasably retained. Each article retaining element also includes an outer protective wrapping 32 which extends around its associated core from one lengthwise end of the latter to its opposite end. This wrapping is constructed of material sufficiently pliable so as to retain at least most of the resiliency of its inner core while, at the same time, displaying a greater degree of resistance to wear than the inner core. In a preferred embodiment the wrapping is vinyl having a thickness of about 5 mils. Moreover, in this preferred embodiment, the outer surface of the wrapping is embossed (roughened) to serve as a friction pad if needed.

The core 30 and outer wrapping 32 just described together comprise the article retaining segment of each element 28. However, each element also includes a support segment which, in a preferred embodiment, is comprised of opposite end sections 34 and 36 of outer wrapping 32. These end sections extend out beyond the core leaving a lengthwise section therebetween to serve as wrapping 32. In order to maintain the wrapping around core 30, the wrapping is joined to itself along a lengthwise seam 38 inward of end sections 34 and 36 and adjacent to core 30. This seam may be sewed in place by means of thread, it may be stapled, glued or heat sealed where, for example, vinyl or similar material is used. In any case, a single substantially longer article retaining element than the one shown is preferrably constructed and eventually cut into a number of individual elements. For reasons to become apparent hereinafter, each of these individual elements is significantly shorter in length than the circumferentially extending length of slots 20, e.g., $\frac{3}{4}$ inch long.

Figure 4A:
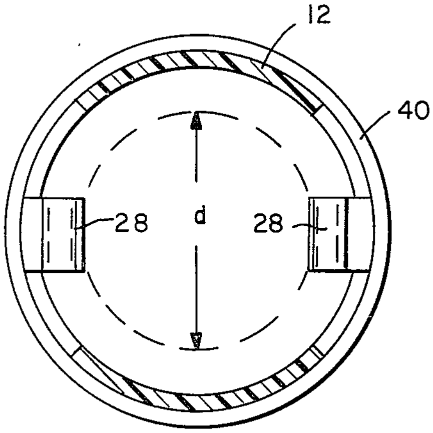
FIGS. 4A and 4B are diagrammatic illustrations in plan view of the bottom end of the assembly of FIG. 1, particularly illustrating the way its discharge opening is varied in size.
Figure 4B:
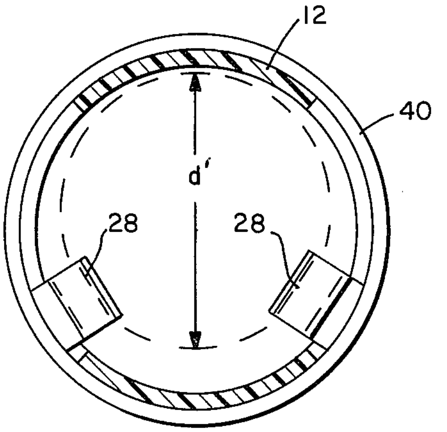

As illustrated best in FIG. 3, the article retaining segments of elements 28 are located within container 12 adjacent discharge opening 18 at the bottom end of the container for establishing the effective size of the opening and for releasably retaining cones 14, one at a time, just above the opening. The support segments of elements 28, that is, the end sections 34 and 36 of wrappings 32 are respectively located within and slidably movable along the lengths of slots 20 for supporting their article retaining segments in adjustable positions around the periphery of container 12 and relative to one another. In this way the effective size of discharge opening 18 can be varied between two extremes as seen best in FIGS. 4A and 4B. Referring specifically to FIG. 4A, the article retainer elements are disposed on diametrically opposite sides of the container so as to define an effective annular discharge opening which has a diameter d and which is the smallest or tightest annular opening which can be provided by the two elements. In order to enlarge the opening the two elements are moved from their FIG. 4A position circumferentially toward one another along the interior of container 12. This causes the effective discharge opening to increase a maximum amount when the two retaining elements are as close as possible to one another as indicated by the diameter d' in FIG. 4B. By circumferentially moving the elements 28 toward or away from one another between the two extremes shown in 4A and 4B the size of the effective discharge opening can be varied between its minimum diameter d and its maximum diameter d'.

It should be apparent from the foregoing that the adjustability of discharge opening 18 is carried out without moving the article retaining segments of elements 28 radially inward or outward with respect to container 12 and it is done without complicated support means. Moreover, it is not necessary to flatten or otherwise deform container 12 in order to accomplish this. All that is necessary is that one or both of the elements be moved along their respective slots. Once their positions are selected, the support portions are maintained fixed by means of a locking ring 40 which fits tightly but slidably around container 12 and over slots 20 so as to lock the support segments between the exterior 24 of container 12 and ring 40, as best seen in FIG. 3. This, in turn fixes the position of each article retaining portion. To readjust their positions all that is necessary is to slide the locking ring out of the position shown in FIG. 3, and thereafter slide one or both of the support portions to a different position and thereafter slide the locking ring back into its FIG. 3 position.

Figure 5:
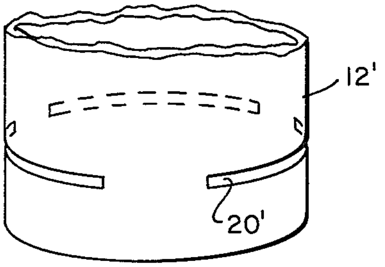
FIG. 5 is a perspective view illustrating the bottom of an article holding and dispensing assembly designed in accordance with a second and preferred embodiment of the present invention.
Figure 6D:
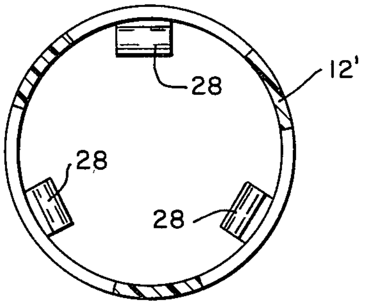
FIGS. 6A, 6B, 6C and 6D are diagrammatic illustrations in plan view of the bottom end of the assembly of FIG. 5, particularly illustrating the way its discharge opening is varied in size.
Figure 6A:
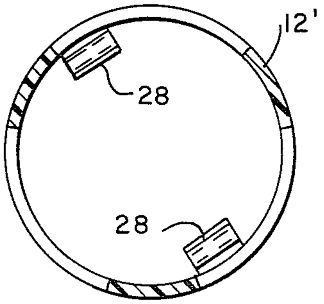
Figure 6B:
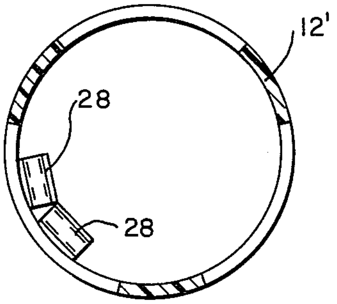
Figure 6C:
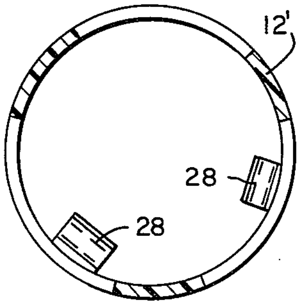

It should also be apparent from the foregoing that the adjustability of arrangement 27 requires the use of two or more article retaining elements and one or more slots depending on the length and positions of the slots. For example, a single slot could provide the extremes shown in FIGS. 4A and B if the single slot is sufficiently long. In a preferred embodiment, three equally circumferentially spaced slots are provided in the container and arrangement 26 contains two or three article retaining elements. The bottom end section of the container including three such slots is shown in FIG. 5. This container is generally indicated by the reference numeral 12' and the slots are indicated at 20'. An overall article holding and dispensing assembly utilizing a container with these three slots and article retaining elements will otherwise be identical to assembly 10 described above. FIGS. 6A–6D illustrate how two or three retaining elements can be used with container 12'. FIG. 6A illustrates the tightest configuration (smallest discharge opening), FIG. 6B the loosest configuration (largest opening) and FIG. 6C an intermediate configuration. FIG. 6D shows one way of using three retaining elements with container 12'.

Whether two or three slots are used and two or three retaining elements, it should be apparent that the resiliency or give in the retaining elements accommodates articles which fluctuate in size, of course to a limited extent. It should also be apparent that the retaining segments are subject to abuse each time a cone or similar article is drawn past them. However, as stated previously, their outer wrappings protect these segments against wear as a result of this abuse. Moreover, because each support segment (end sections 34 and 36) is integrally formed with a wrapping, this minimizes the possibility of inadvertently separating the retaining segment from its support segment as a passing article being withdrawn tends to pull the former downward and away from the latter.

Overall assembly 10 thus far described in conjunction with FIGS. 1 to 6 may be identical to the assembly described in the previously recited FUSS application. However, in accordance with the present invention, container 12 whether it includes two slots as in FIGS. 4A and B or three slots as in FIGS. 5 and 6A to D, is provided with a locked ring 42 for preventing cones 14, once dispensed through opening 18, from being reinserted into the container through the opening. As seen best in FIG. 3, this locking ring, which is preferrably constructed of plastic, has an outer surface configuration sized and shaped to provide a relatively tight but readily positionable and removable fit concentrically within container 12. The locking ring is located directly adjacent the article retaining segments of elements 28, opposite discharge opening 18, and is sufficiently thick to limit the movement or play of the article retaining segments in an upward and outward direction, which movement or play enlarges the effective opening into the container between the retaining segments. This movement or play is sufficiently limited by the locking ring such that the article retaining segments prevent a cone, once dispensed, from being reinserted back into the container through opening 18. In this regard, it should be apparent that the locking ring does not affect the downward and outward movement or play of the segment, thereby allowing the cones to be readily drawn out of the container through the discharge opening.

Locking ring 42 is especially suitable for use in assembly 10 as described above, that is, an assembly including adjustable article retaining elements, supported in two or more elongated slots of the type described. However, it is to be understood that the locking ring is equally applicable where the article retaining elements are not adjustable. Moreover, these elements are not limited to the above-described construction so long as they are compatable with the present invention.

What is claimed is:

1. An article holder and dispenser for nested articles such as ice cream cones, cups and the like comprising an elongate hollow container means for storing the articles therein, said container means having an interior surface and defining a discharge opening at one end thereof for dispensing the articles therethrough, a plurality of circumferentially spaced article retaining means located within said container means adjacent its interior surface and the periphery of said discharge opening for establishing the effective size of said opening in order to releasably retain the articles to be dispensed, means supporting all of said retaining means for limited circumferential movement relative to one another adjacent the interior surface of said container means for varying the effective size of said discharge opening without distorting the shape of said container means, means for releasably maintaining said retaining means in adjustably fixed circumferential positions relative to one another whereby to fix the effective size of said opening and means cooperating with said retaining means for preventing the latter from allowing said articles, once dispensed, from being re-inserted back into said container means through said discharge opening, said preventing means being separate from said retaining means and being disposed in a fixed position adjacent said retaining means opposite said discharge opening.

2. An article holder and dispenser according to claim 1 wherein said container means includes a plurality of elongated circumferentially extending through slots at least equal in number to said retaining means and spaced from one another around its periphery and wherein said supporting means includes an equal plurality of elongated tabs shorter in elongation than said slots, each of said tabs being connected with and extending out from an associated one of said retaining means, said tabs being respectively located within and slidably movable along the lengths of associated ones of said slots for supporting said retaining means for said limited circumferential movement.

3. An article holder and dispenser according to claim 2 wherein each of said article retaining means includes a core and an associated outer wrapping which extends around said core from one lengthwise end of the latter to its opposite end and which, together with said core, provides suffient resiliency for releasably retaining said articles without damaging the latter while at the same time accommodating to a limited extent size variations in the articles to be dispensed for a given size of said discharge opening, said core and outer wrapping of each retaining means being located lengthwise against the interior surface of said container means regardless of their positions relative to one another.

4. An article holder and dispenser according to claim 3 wherein each of said outer wrappings includes an integral end section extending out beyond its associated core and serving as at least part of an associated tab sufficiently long to extend into and through an associated one of said slots and sufficiently thin relative to said slot to slide in the latter.

5. An article holder and dispenser according to claim 4 wherein said wrapping end sections extend through their associated slots from the interior of said containing means to the exterior thereof and wherein said maintaining means includes a locking ring located around and slidable along said container means for disengagably maintaining said end sections in fixed position against the outer surface of said container means whereby to fix the effective size of said discharge opening.

6. An article holder and dispenser according to claim 4 wherein each of said outer wrappings includes a second opposite integral end section extending out beyond its associated core and serving as a second part of an associated tab, said outer wrapping being joined to itself along a lengthwise seam inward of said opposite end sections adjacent its associated core for holding the latter in place.

7. An article holder and dispenser according to claim 6 wherein the outer surface of said wrappings are roughened so as to serve as friction pads.

8. An article holder and dispenser according to claim 1 wherein said container means includes at least one circumferentially extending through slot extending part way around its periphery and wherein said supporting means includes a plurality of tabs connected with and extending out from said retaining means, each of said tabs being narrower lengthwise than said slot and being located within and slidable along said slot for supporting said retaining means for said limited circumferential movement.

9. An article holder and dispenser according to claim 2 wherein said container means includes at least one more of said through slots than said retaining means.

10. In an article holder and dispenser for storing and dispensing nested articles such as ice cream cones, cups and the like, an elongate hollow container of cylindrical configuration defining a discharge opening at one end thereof for passage of said articles, said container including a plurality of circumferentially extending through slots spaced from one another around its periphery, an equal plurality of retainer elements respectively including article retaining segments located within said container adjacent said discharge opening for establishing the effective size of said opening for releasably retaining the articles to be dispensed, said retainer elements also including support segments respectively located within and slidably movable along the lengths of said slots for supporting said article retaining segments for limited circumferential movement relative to one another so as to place said segments at adjustable positions around the periphery of said container whereby to vary the effective size of said discharge opening, and means for maintaining said support segments in fixed positions within their respective slots whereby to fix the effective size of said opening, and a retainer locking ring removably disposed within said container in a fixed position adjacent said article retaining segments opposite said discharge opening for preventing said segments from allowing said articles, once dispensed, from being reinserted back into said container through said discharge opening.

* * * * *